(12) United States Patent
Dougherty

(10) Patent No.: US 6,917,329 B2
(45) Date of Patent: Jul. 12, 2005

(54) FLEXIBLE ARCHITECTURE GPS RECEIVER

(75) Inventor: J. Marsh Dougherty, Chevy Chase, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/613,132

(22) Filed: Jul. 1, 2003

(65) Prior Publication Data

US 2005/0001764 A1 Jan. 6, 2005

(51) Int. Cl.$^7$ .............................................. G01S 5/14
(52) U.S. Cl. ................... 342/357.12; 701/213
(58) Field of Search ...................... 342/357.12; 701/213

(56) References Cited

U.S. PATENT DOCUMENTS 5,420,593 A * 5/1995 Niles ...................... 342/357.12
6,118,808 A    9/2000 Tiemann et al.

* cited by examiner

Primary Examiner—Gregory C. Issing
(74) Attorney, Agent, or Firm—Benjamin Y. Roca, Esq.

(57) ABSTRACT

A flexible architecture GPS receiver having an intelligent buffer for capturing incoming sampled RF signals at a rate consistent with the GPS bandwidth and subsequent repeated "playbacks" of the buffered data at rates consistent with FPGA/ASIC hardware. The GPS receiver utilizes a "batch-mode" concept which provides for the potential of simultaneous search and tracking of GPS signals. The GPS further receiver uses lossless multiplexing for allowing single channel receiver hardware to process multiple satellite signals, i.e., to behave as multi-channel receiver hardware, without any substantial performance degradation.

24 Claims, 1 Drawing Sheet

FLEXIBLE ARCHITECTURE GPS RECEIVER

CROSS-REFERENCE TO RELATED APPLICATIONS

This application claims the benefit of prior filed U.S. application Ser. No. 60/251,339, filed Dec. 5, 2000, the disclosure of which is hereby incorporated herein by reference.

BACKGROUND OF THE INVENTION

1. Field of the Invention

The present invention generally relates to a flexible architecture Global Positioning System (GPS) receiver. The present invention also relates to a method for processing GPS signals which provides for the potential of simultaneous search and tracking of the GPS signals by the GPS receiver. The present invention further relates to using lossless multiplexing for allowing single channel receiver hardware to process multiple satellite signals, i.e., to behave as multi-channel receiver hardware, without any substantial performance degradation.

2. Description of the Related Art

One of the most demanding functions performed by a GPS receiver is signal acquisition. Traditional GPS receivers are implemented in a real-time mode in which each sampled bit of the input signal is processed sequentially as it becomes available. This is the easiest way to mechanize a receiver, but it has significant limitations.

In order to process each sampled bit of input signal sequentially as it becomes available, the typical approach of prior art GPS receivers is to slew the local signals until they match up with the unknown GPS signals; from then on, the signals are tracked using standard phase-locked and delay-locked techniques. The amount of slewing or searching is a function of the uncertainties in the receiver's position, time, satellite position estimates, etc. as well as a function of the receiver's implementation of correlators, SNRs, dwell time algorithms, etc. Hence, there are many factors contributing to the amount of slewing or searching in a typical prior art GPS receiver.

Further, regardless of how the GPS receiver is implemented, all real-time traditional GPS receivers must search, and while they are searching, the signal is not being tracked and measurements are not being made. Such receivers are therefore referred to as "single-mode" GPS receivers, because they are only capable of either searching or tracking at any given time. Further still, prior art GPS receivers include receiver software which must contend with a variety of asynchronous events.

A need therefore exists for a GPS receiver which is not implemented exclusively in the real-time mode. The need further exists for a GPS receiver capable of simultaneously searching and tracking signals, i.e., a "batch-mode" GPS receiver. Additionally, a need also exists for a GPS receiver operated by software which contends with only synchronous interruptions.

SUMMARY OF THE INVENTION

The present invention provides a flexible architecture GPS receiver having an intelligent buffer for capturing incoming sampled RF signals at a rate consistent with the GPS bandwidth (e.g., 2 MHz) and performing subsequent repeated "playbacks" of the buffered; data at rates consistent with FPGA/ASIC hardware (e.g., 50 MHz). The GPS receiver of the present invention uses lossless multiplexing for allowing single channel receiver hardware of the GPS receiver to process multiple satellite signals, i.e., for the single channel receiver hardware to behave as multi-channel receiver hardware, without any substantial performance degradation.

The key benefit of the intelligent buffer is the substantial processing leverage that is realized. The example frequency numbers, i.e., 2 MHz and 50 MHz, reflect a processing gain of 25 which is a major improvement over prior art GPS receivers. Other frequency numbers can be used to alter the processing gain of the inventive GPS receiver.

DESCRIPTION OF THE PREFERRED EMBODIMENTS

Figure 1:
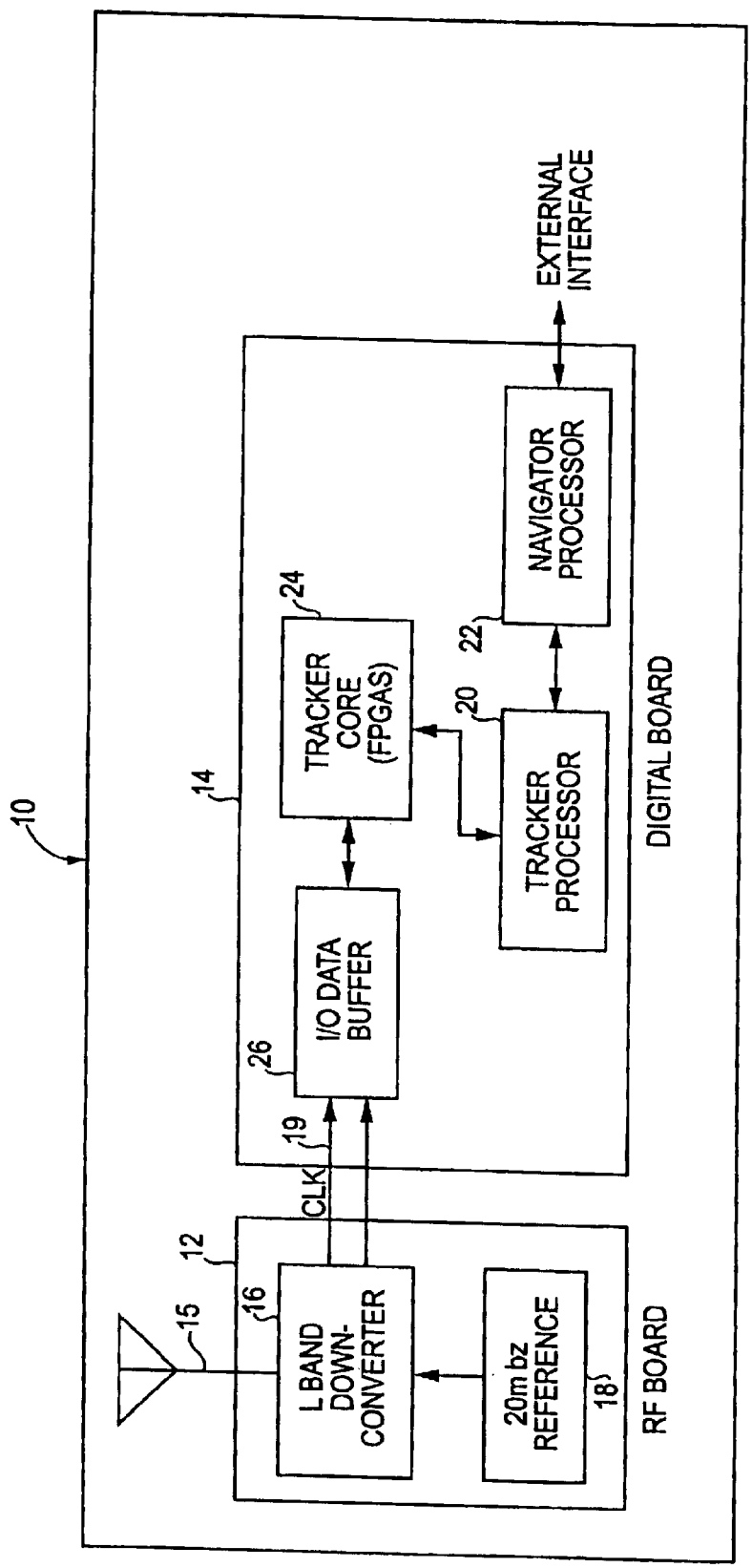
FIG. 1 is a block diagram of the flexible architecture GPS receiver according to the present invention.

The present invention provides a flexible architecture GPS receiver having an intelligent buffer for capturing incoming sampled RF signals at a rate consistent with the GPS bandwidth (e.g., 2 MHz) and performing subsequent repeated "playbacks" of the buffered data at rates consistent with FPGA/ASIC hardware (e.g., 50 MHz). The key benefit of the intelligent buffer is the substantial processing leverage that is realized. The example frequency numbers reflect a processing gain of 25 which is a major improvement over prior art GPS receivers. Other frequency numbers can be used to alter the processing gain of the inventive GPS receiver.

With reference to FIG. 1, a detailed description will now be provided as to the "batch-mode" flexible architecture GPS receiver of the present invention. The GPS receiver designated generally by reference numeral 10 in FIG. 1 utilizes a "batch-node" concept which provides for the potential of simultaneous search and tracking of GPS signals. The GPS receiver 10 includes an RF Front End board 12 and a Digital Processing and Control board 14.

The RF Front End board 12 is preferably constructed on a six layer impedance controlled FR4 board. The RF Front End board 12 includes a three pole L band filter and Low Noise Amplifier (LNA) 16 connected to an antenna 15 for receiving an input signal. The input signal is fed to an active mixer creating an IF at 10.02 MHz. A local oscillator (LO) signal of approximately 1565.4 MHz is synthesized by a phase-locked loop using a 20 MHz reference signal 18 generated by a Temperature Compensated Crystal Oscillator (TCXO) as known in the art. The TCXO provides a single reference source from which LO, sampling clock, and system timing are derived.

The IF is filtered with a five pole filter and then amplified and further filtered. The 10.02 MHz signal is then split into Inphase (I) and Quadrature (Q) channels by a 90-degree power divider. The I and Q signals are then capacitively coupled into a combined voltage comparator and sampler circuit clocked at 20 MHz. This effectively creates a one-bit quantized, 20 MHz sampled analog-to-digital conversion. The sample data are then digitally mixed to remove the 10 MHz offset and sub-sampled to 2 MHz.

The RF Front End board 12 provides the Inphase and Quadrature sampled data along with the sampling clock to the Digital Processing and Control board 14. The sampling clock is used as the time reference by the Digital Processing and Control board 14.

The Digital Processing and Control board 14 performs tracking functions using a tracker processor 20 and navigation functions using a navigator processor 22. The tracking and navigation functions can be performed simultaneously via "batch" mode processing of the sample data, rather than real-time processing. The navigator processor 22 is a DSP with floating point capability which provides control of the tracker processor 20, performs aids calculations, and performs navigation functions and communication services.

The interface between the navigator processor 22 and the tracker processor 20 is preferably by a dual-port memory for providing a simple interface. All the software for the GPS receiver 10 preferably resides in Flash memory that can be easily modified by uploading new software from a diagnostic port of an external interface, e.g., RS-232, controlled by the navigator processor 22.

The tracker core hardware 24 includes a set of four Field Programmable Gate Arrays (FPGAs). The tracker processor 20 is also a DSP with floating point capability and is used to control and maintain tracking states of the single channel tracker core. A channel is defined as containing an intelligent I/O data buffer 26, tracker core (FPGAs) hardware 24, and the tracker processor 20. The tracker processor 20 further outputs range and Doppler information from satellites tracked. Alternative realizations of the flexible architecture concept could include multi-channel implementations.

The I/O data buffer 26 receives a sampling clock signal 19 from the L Band filter 16 and intelligently buffers real-time sampled bits and feeds them to the tracker core hardware 24 under software control in batches. The tracker core hardware 34, typically implemented as a custom gate array or set of FPGAs, can operate many times faster (e.g., 50 MHz) than the sampling data rate of the GPS signals (e.g., 2 MHz). This exemplary twenty-five-to-one ratio permits the cycling or repeated "playbacks" of the buffered raw GPS data by the intelligent data buffer 25 multiple times to allow a single tracker core hardware channel to act as a full multi-channel receiver. The single tracker core hardware channel is effectively used as a lossless multiplexed receiver which reduces the amount of tracker hardware over prior art GPS receivers and also eliminates channel-to-channel hardware biases.

One of the features of the architecture of the GPS receiver 10 is that the tracker core hardware 24 acts more like a coprocessor to the software than traditional tracker hardware. The tracker core hardware 24 is purely a peripheral slave to the software executed by the tracker processor 20 and is controlled as follows. The tracker processor 20 loads into the tracker core hardware 24 a current tracking state vector, e.g., time, satellite ID, code phase, code phase rate, carrier phase, and carrier phase rate.

Once the tracker core hardware 24 has been loaded, the tracker processor 20 commands the intelligent I/O data buffer 26 to stream sampled data, e.g., 2000 bits or half a milliseconds worth of sampled data, into the tracker core hardware 24. The tracker core hardware 24 will process this batch of signals in a fraction of the time it took to collect this data (ratio of the hardware speed to input data rate).

At the end of the batch, correlation data are read out of the tracker core hardware 24. The tracker core hardware 24 then waits for another tracking state vector; it is the tracker processor 20 that determines if another time period, another satellite, or another search space is to be processed next. In this way the tracker processor 20 is always in control and the tracker core hardware 24 is given small tokenized tasks that can be used for searching as well as signal tracking. During the time the tracker core hardware 24 is processing the current batch of signals, the tracker processor 20 is executing software for processing the correlation data produced from the previous batch.

A very important application area which is envisioned with the inventive GPS receiver 10 is that of poor signal visibility. Specifically for a number of applications there are only short glimpses of when the GPS signals are available. Accordingly, in such applications, a receiver can only make measurements whenever these signals are available and only after the signals have been acquired. The architecture of the GPS receiver 10 disclosed herein is uniquely positioned to provide the capability of making measurements even when the signals are signals intermittent. This is possible by including the ability to search through the data without advancing time.

As illustrated in FIG. 1, the general operational approach of the GPS receiver 10 is to decouple the real-time front end functions from the signal tracking functions of the flexible architecture GPS receiver 10. The RF front end board 12 performs the RF downconversion (single stage) and baseband Inphase and Quadrature one bit quantized sampling at the data sampling rate, e.g., 2 MHz. The decoupling is accomplished by the inclusion of the intelligent I/O buffer 26 which is filled at the data sampling rate and is accessed under software control, e.g., in 0.5 millisecond batches.

The tracker core hardware 24 is designed to operate at speeds much greater than the input sampling rate (e.g., 50 MHz versus 2 MHz). This permits a unique method of processing GPS signals. A single channel of hardware (I/O data buffer 26, tracker core (FPGAs) 24, and tracker processor 20) can be used to sequentially process signals from multiple sources, i.e., multiple satellites, thereby creating a multichannel receiver.

It is noted that this is a lossless multiplexing approach. With just a mode change in software, the same single hardware channel can be used to provide rapid acquisition for the signals. By appropriately combining intelligent acquisition and tracking channels (performed sequentially with a single hardware channel) a "zero acquisition time" receiver could be realized, thereby achieving the goal of producing a measurement for each time interval in which GPS energy is available to the antenna 15.

The concept of "batch-mode" tracking not only has significant hardware benefits, but can also provide substantial software benefits. The software-in prior art real-time mode implemented GPS receivers must respond to many different asynchronous events such as individual satellite epochs and various measurement epochs An advantage of the architecture of the GPS receiver 10 is that there is only a single synchronous event to respond to the measurement epoch which is related to the buffer size. This makes modifying and validating software much easier To provide flexibility for various processing algorithms, the flexible architecture GPS receiver 10 uses multiple computer elements. The navigation and control functions are performed on a dedicated host microprocessor and each hardware channel has its own DSP microprocessor. The software interface between these elements is well defined, thereby further easing adaptability.

What has been described herein is merely illustrative of the application of the principles of the present invention. Other arrangements and methods may be implemented by those skilled in the art without departing from the scope and spirit of this invention.

What is claimed:

1. A Global Positioning System (GPS) receiver comprising:

a first section having a signal acquisition stage for acquiring an input signal and a sampling stage for sampling the input signal at a sampling data rate to provide sampled data; and a second section having an I/O data buffer for receiving and buffering the sampled data and providing the buffered data to tracker hardware, wherein the tracker hardware operates at an operational rate which is greater than the sampling data rate of the input signal enabling multiple cycling of the buffered data by the I/O data buffer, wherein the tracker hardware is single channel receiver hardware behaving as multi-channel receiver hardware wherein the tracker hardware includes a plurality of Field Programmable Gate Arrays for operating the tracker hardware at the operational rate, further comprising a first processor for at least performing navigation functions and controlling the tracker hardware, and a second processor for at least performing tracking functions, wherein the first and second processors are interfaced by interface hardware.

2. The GPS receiver according to claim 1, wherein the sampling data rate is approximately 2 MHz and the operational rate is approximately 50 MHz.

3. The GPS receiver according to claim 1, wherein the interface hardware is a dual-port memory.

4. The GPS receiver according to claim 1, further comprising an external interface connected to the first processor for at least uploading software to the first processor.

5. The GPS receiver according to claim 1, wherein the second processor provides data associated with a tracking state vector to the tracker hardware and controls the I/O data buffer to stream at least a portion of the sampled data to the tracker hardware for processing.

6. The GPS receiver according to claim 5, wherein the second processor processes data outputted by the tracker hardware from processing a previous data stream while the tracker hardware processes the at least the portion of the sampled data.

7. The GPS receiver according to claim 1, wherein the tracking and navigation functions are performed simultaneously.

8. The GPS receiver according to claim 1, wherein the sampled data provided by the first section includes Inphase and Quadrature sampled data, and wherein the first section further provides a sampling clock to the second section.

9. The OPS receiver according to claim 1, wherein the I/O data buffer provides the sampled data to the tracker hardware in batches to provide for batch-mode processing of the sampled data.

10. The GPS receiver according to claim 1, wherein the signal acquisition stage includes a down-converter filter and a Low Noise Amplifier (LNA) connected to an antenna for acquiring the input signal.

11. A Global Positioning System (OPS) receiver comprising:

a first section having a signal acquisition stage for acquiring an input signal and a sampling stage for sampling the input signal at a sampling data rate to provide sampled data; and a second section having an I/O data buffer for receiving and buffering the sampled data and providing the buffered data to tracker hardware in batches to be processed by the tracker hardware by batch-mode processing.

12. The GPS receiver according to claim 11, wherein the tracker hardware is single channel receiver hardware behaving as multi-channel receiver hardware.

13. The GPS receiver according to claim 11, wherein the tracker hardware includes a plurality of Field Programmable Gate Arrays.

14. The GPS receiver according to claim 11, wherein the sampling data rate is approximately 2 MHz, and wherein an operational rate of the tracker hardware is approximately 50 MHz.

15. The OPS receiver according to claim 11, further comprising a first processor for at least performing navigation functions and controlling the tracker hardware, and a second processor for at least performing tracking functions.

16. The GPS receiver according to claim 15, wherein the second processor provides data associated with a tracking state vector to the tracker hardware and controls the I/O data buffer to stream at least a portion of the sampled data to the tracker hardware for processing.

17. The GPS receiver according to claim 16, wherein the second processor processes data outputted by the tracker hardware from processing a previous data stream while the tracker hardware processes the at least the portion of the sampled data.

18. The GPS receiver according to claim 15, wherein the tracking and navigation functions are performed simultaneously.

19. The GPS receiver according to claim 11, wherein the sampled data provided by the first section includes Inphase and Quadrature sampled data, and wherein the first section further provides a sampling clock to the second section.

20. The GPS receiver according to claim 11, wherein the signal acquisition stage includes a down-converter filter and a Low Noise Amplifier (LNA) connected to an antenna for acquiring the input signal.

21. A method for processing an input signal received by a Global Positioning System (GPS) receiver, the method comprising the steps of:

sampling the input signal at a sampling data rate to provide sampled data;

buffering the sampled data by a data buffer; and providing the buffered data to tracker hardware in batches to be processed by the tracker hardware by batch-mode processing.

22. The method according to claim 21, wherein the tracker hardware is single channel receiver hardware behaving as multi-channel receiver hardware.

23. The method according to claim 21, wherein the tracker hardware includes a plurality of Field Programmable Gate Arrays.

24. The method according to claim 21, wherein the sampling data rate is approximately 2 MHz, and wherein an operational rate of the tracker hardware is approximately 50 MHz.

* * * * *

UNITED STATES PATENT AND TRADEMARK OFFICE
CERTIFICATE OF CORRECTION

PATENT NO.    : 6,917,329 B2
DATED         : July 12, 2005
INVENTOR(S)   : J. Marsh Dougherty It is certified that error appears in the above-identified patent and that said Letters Patent is hereby corrected as shown below:

Column 5,
Line 42, delete "the at least" and insert -- at least --.
Lines 51 and 59, delete "OPS" and insert -- GPS --.

Column 6,
Line 18, delete "OPS" and insert -- GPS --.
Line 29, delete "the at least" and insert -- at least --.

Signed and Sealed this

Thirty-first Day of January, 2006

JON W. DUDAS
*Director of the United States Patent and Trademark Office*